(12) United States Patent
O'Connell (10) Patent No.: US 10,508,034 B2
(45) Date of Patent: Dec. 17, 2019

(54) EXTENDED THERMAL STAGE SULFUR RECOVERY PROCESS (71) Applicant: SAUDI ARABIAN OIL COMPANY, Dhahran (SA)

(72) Inventor: John P. O'Connell, Dhahran (SA)

(73) Assignee: Saudi Arabian Oil Company, Dharan (SA)

( * ) Notice: Subject to any disclaimer, the term of this patent is extended or adjusted under 35 U.S.C. 154(b) by 0 days.

(21) Appl. No.: 16/257,869

(22) Filed: Jan. 25, 2019

(65) Prior Publication Data
US 2019/0152780 A1 May 23, 2019

Related U.S. Application Data (63) Continuation of application No. 15/815,980, filed on Nov. 17, 2017, now Pat. No. 10,246,329.

(51) Int. Cl.
C01B 17/04 (2006.01)
C01B 17/16 (2006.01)
(Continued)

(52) U.S. Cl.
CPC ......... *C01B 17/0426* (2013.01); *B01J 12/007* (2013.01); *B01J 19/0013* (2013.01);
(Continued)

(58) Field of Classification Search
CPC ..... C01B 17/04; C01B 17/0404; C01B 17/16; B01J 12/00; B01J 19/00; B01D 53/52; B01D 53/8612; B01D 2257/304
See application file for complete search history.

(56) References Cited

U.S. PATENT DOCUMENTS 2,594,149 A 4/1952 Gamson
2,889,207 A 6/1959 Eliot
(Continued)

FOREIGN PATENT DOCUMENTS

| EP | 1060000 B1 | 12/2003 |
| WO | 2015069975 A1 | 5/2015 |
| WO | 2016102652 A1 | 6/2016 |

OTHER PUBLICATIONS

International Search Report and Written Opinion for related PCT application PCT/US2018/060182 dated Jan. 23, 2019.

*Primary Examiner* — Timothy C Vanoy
(74) *Attorney, Agent, or Firm* — Bracewell LLP; Constance G. Rhebergen (57) ABSTRACT

A process for recovering sulfur in a sulfur recovery unit comprising the steps of reacting hydrogen sulfide and oxygen in the reaction furnace at a minimum reaction temperature to produce a reaction effluent; reducing the temperature of the reaction effluent from the minimum reaction temperature to a boiler section outlet temperature to produce a cooled effluent, the cooled effluent comprises hydrogen sulfide, sulfur dioxide, and sulfur-containing contaminants; reacting the hydrogen sulfide, sulfur dioxide, and sulfur-containing contaminants in the catalytic extension to produce a boiler catalytic effluent; reducing the boiler catalytic effluent temperature such that the elemental sulfur condenses to form liquid sulfur and a gases stream; reacting the hydrogen sulfide and sulfur-containing contaminants with the oxygen to produce an oxidizer outlet stream comprises sulfur dioxide; and separating the sulfur dioxide in the scrubbing unit to produce a recycle stream and an effluent gases, the recycle stream comprises sulfur dioxide.

11 Claims, 5 Drawing Sheets (51) Int. Cl.
    *C01B 17/50*     (2006.01)
    *B01J 12/00*     (2006.01)
    *B01J 19/00*     (2006.01)

(52) U.S. Cl.
    CPC ........... *B01J 19/0053* (2013.01); *C01B 17/16* (2013.01); *C01B 17/508* (2013.01)

(56) References Cited

U.S. PATENT DOCUMENTS

| | | |
|---|---|---|
| 3,190,730 A | 6/1965 | Paul et al. |
| 3,822,341 A | 7/1974 | Smith |
| 4,138,473 A | 2/1979 | Gieck |
| 5,397,556 A | 3/1995 | Towler et al. |
| 7,648,692 B2 | 1/2010 | Chow et al. |
| 7,658,906 B2 | 2/2010 | Keller et al. |
| 9,352,295 B2 | 5/2016 | Rafique et al. |
| 9,556,030 B2 | 1/2017 | O'Connell |
| 2008/0050306 A1 | 2/2008 | Keller et al. |

EXTENDED THERMAL STAGE SULFUR RECOVERY PROCESS

CROSS-REFERENCE TO RELATED APPLICATIONS

This application is related to and claims priority from U.S. Non-Provisional application Ser. No. 15/815,980 filed on Nov. 17, 2017. For purposes of United States Patent practice, the application is incorporated herein in its entirety.

BACKGROUND OF THE ART

Technical Field

Disclosed are an apparatus and process for recovery of elemental sulfur. More specifically, disclosed are an apparatus and process for recovery of elemental sulfur and removal of sulfur-containing contaminants from an acid gas stream.

Background

The sulfur recovery industry has been using the Claus gas phase reactions as the basis for recovering elemental sulfur from hydrogen sulfide ($H_2S$) since the 1940s. The Claus plant, the long-standing 'workhorse' of the industry, uses the Claus chemistry to achieve between 96% and 98% recovery of elemental sulfur from the hydrogen sulfide in an acid gas streams. The gas phase elemental sulfur from the Claus plant is subsequently condensed and collected in the liquid form.

The vast majority of all operating Claus plants worldwide include a thermal stage (including a free-flame reaction furnace and a wasteheat boiler) followed by either 2 or 3 catalytic stages, with each stage including a reheater, a catalytic converter, and a condenser. The Claus plants result in recovery efficiencies of 96 percent (%) for a 2-stage design or 98% for a 3-stage design. There are only a handful of 4-stage designs in the world because, early on, the sulfur recovery industry recognized that a $4^{th}$ catalytic stage only marginally increased the recovery efficiency greater than 98% and was therefore uneconomical.

Owing to the negative impact of acid rain, formed due to high levels of sulfur dioxide ($SO_2$) in the atmosphere, local environmental regulatory bodies imposed limits on the amount of sulfur dioxide emitted in the effluent of Claus plants. In response, the industry began developing Tail Gas Treatment (TGT) technologies to be placed immediately downstream of the Claus plant to further improve the recovery efficiency of the sulfur recovery unit to greater than 99%, or in some cases greater than 99.9%, while removing $SO_2$ from the effluent.

While the Claus plant does provide a path for recovery of sulfur, it is not without drawbacks. The catalytic stages require regeneration and replacement due to catalyst fouling plugging and various deactivation mechanisms. Replacement of catalyst can require significant downtime, potentially putting the entire processing unit offline. The catalytic stages are sensitive to the presence of contaminants and to the temperature of the catalytic feed stream. These sensitivities can make controlling the catalytic stages cumbersome.

SUMMARY

Disclosed are an apparatus and process for recovery of elemental sulfur. More specifically, disclosed are an apparatus and process for recovery of elemental sulfur and removal of sulfur-containing contaminants from an acid gas stream.

In a first aspect, a process for recovering sulfur in a sulfur recovery unit is provided. The process includes the steps of introducing an acid gas feed to a reaction furnace, where the acid gas feed includes hydrogen sulfide, introducing a fuel gas to the reaction furnace, introducing air feed to the reaction furnace, where the air feed includes oxygen, reacting the hydrogen sulfide and oxygen in the reaction furnace at a minimum reaction temperature to produce a reaction effluent, where the reaction effluent includes elemental sulfur and sulfur dioxide, where the reaction effluent is at the minimum reaction temperature, introducing the reaction effluent to a wasteheat stage of an extended boiler stage, reducing the temperature of the reaction effluent from the minimum reaction temperature to a boiler section outlet temperature to produce a cooled effluent that includes hydrogen sulfide, sulfur dioxide, and sulfur-containing contaminants, where the temperature of the reaction effluent is reduced by capturing heat energy, introducing the cooled effluent to a catalytic extension of the extended boiler stage, where the catalytic extension includes a catalyst and has a gross hourly space velocity between 3000 $h^{-1}$ and 6000 $h^{-1}$, reacting the hydrogen sulfide, sulfur dioxide, and sulfur-containing contaminants in the catalytic extension to produce a boiler catalytic effluent that includes elemental sulfur, where the boiler catalytic effluent is at a boiler catalytic effluent temperature, introducing the boiler catalytic effluent to a condenser, where the boiler catalytic effluent includes elemental sulfur, reducing the boiler catalytic effluent temperature such that the elemental sulfur condenses to form liquid sulfur and a gases stream, introducing the gases stream to a thermal oxidizer, where the gases stream includes hydrogen sulfide and sulfur-containing contaminants, introducing an air stream to the thermal oxidizer, where the air stream includes oxygen, reacting the hydrogen sulfide and sulfur-containing contaminants with the oxygen to produce an oxidizer outlet stream that includes sulfur dioxide, introducing the oxidizer outlet stream to a scrubbing unit, and separating the sulfur dioxide in the scrubbing unit to produce a recycle stream and an effluent gases, where the recycle stream includes sulfur dioxide.

In certain aspects, the process further includes the step of introducing the recycle stream to the reaction furnace. In certain aspects, the process further includes the steps of introducing a boiler feed water to the extended boiler stage, and increasing the temperature of the boiler feed water to produce a high pressure steam, where the heat captured from the reaction effluent is used to increase the temperature of the boiler feed water. In certain aspects, the minimum reaction temperature is between 850 deg C. and 1250 deg C. In certain aspects, the boiler section outlet temperature is between 148 deg C. and 254 deg C. In certain aspects, the boiler catalytic effluent temperature is between 250 deg C. and 400 deg C. In certain aspects, the catalyst is titania extrudate. In certain aspects, an overall conversion of sulfur compounds to elemental sulfur is greater than 99.9 mol %. In certain aspects, the process further includes the steps of analyzing a composition of the gases stream in a tail gas analyzer; and adjusting a flow rate of the air feed based on the composition of the gases stream to maintain a stoichiometric ratio of hydrogen sulfide to sulfur dioxide of 2:1. In certain aspects, the process further includes the steps of measuring the minimum reaction temperature in the reaction furnace with a temperature sensor and adjusting a flow rate of the fuel gas to maintain the minimum reaction temperature.

In a second aspect, an apparatus for recovering sulfur from an acid gas stream is provided. The apparatus includes a reaction furnace configured to contain a reaction between hydrogen sulfide in the acid gas stream and oxygen in an air feed to produce a reaction effluent, where the reaction furnace operates at a minimum reaction temperature, where the reaction effluent includes elemental sulfur; an extended boiler stage that includes a wasteheat stage fluidly connected to the reaction furnace, the wasteheat stage configured to capture heat energy from a reaction effluent to produce a cooled effluent at a boiler section outlet temperature, and a catalytic extension physically connected to the wasteheat stage, the catalytic extension configured to allow a reaction to convert sulfur compounds to produce a boiler catalytic effluent that includes elemental sulfur, where the catalytic extension includes a catalyst section that includes a catalyst; a condenser fluidly connected to the catalytic extension, the condenser configured to condense the elemental sulfur to produce liquid sulfur and a gases stream; a thermal oxidizer fluidly connected to the condenser, the thermal oxidizer configured to oxidize sulfur compounds in the gases stream and oxygen in an air stream to produce an oxidizer outlet stream that includes sulfur dioxide; and a scrubbing unit fluidly connected to the thermal oxidizer, and the scrubbing unit configured to separate the sulfur dioxide from the gases stream to produce a recycle stream and an effluent gases stream, where the recycle stream includes the sulfur dioxide.

In certain aspects, the wasteheat stage includes a heat exchanger. In certain aspects, the catalytic extension has a gross hourly space velocity between 3000 h−1 and 6000 h−1. In certain aspects, the apparatus further includes a tail gas analyzer fluidly connected to the condenser, the tail gas analyzer configured to analyze a composition of the gases stream. In certain aspects, the apparatus further includes a temperature sensor fluidly connected to the reaction furnace, the temperature sensor configured to measure the minimum reaction temperature in the reaction furnace.

BRIEF DESCRIPTION OF THE DRAWINGS

These and other features, aspects, and advantages will become better understood with regard to the following descriptions, claims, and accompanying drawings. It is to be noted, however, that the drawings illustrate only several embodiments and are therefore not to be considered limiting of the scope as it can admit to other equally effective embodiments.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments. Accordingly, the exemplary embodiments described here are set forth without any loss of generality, and without imposing limitations.

The apparatus and method described here are directed to a sulfur recovery unit that includes an extended boiler stage following the reaction furnace and do not include a conventional Claus catalytic stage. The extended boiler stage includes a wasteheat stage to remove heat from the reaction effluent and a catalytic extension to catalyze Claus reactions and reactions to convert sulfur-containing contaminants.

Figure 1:
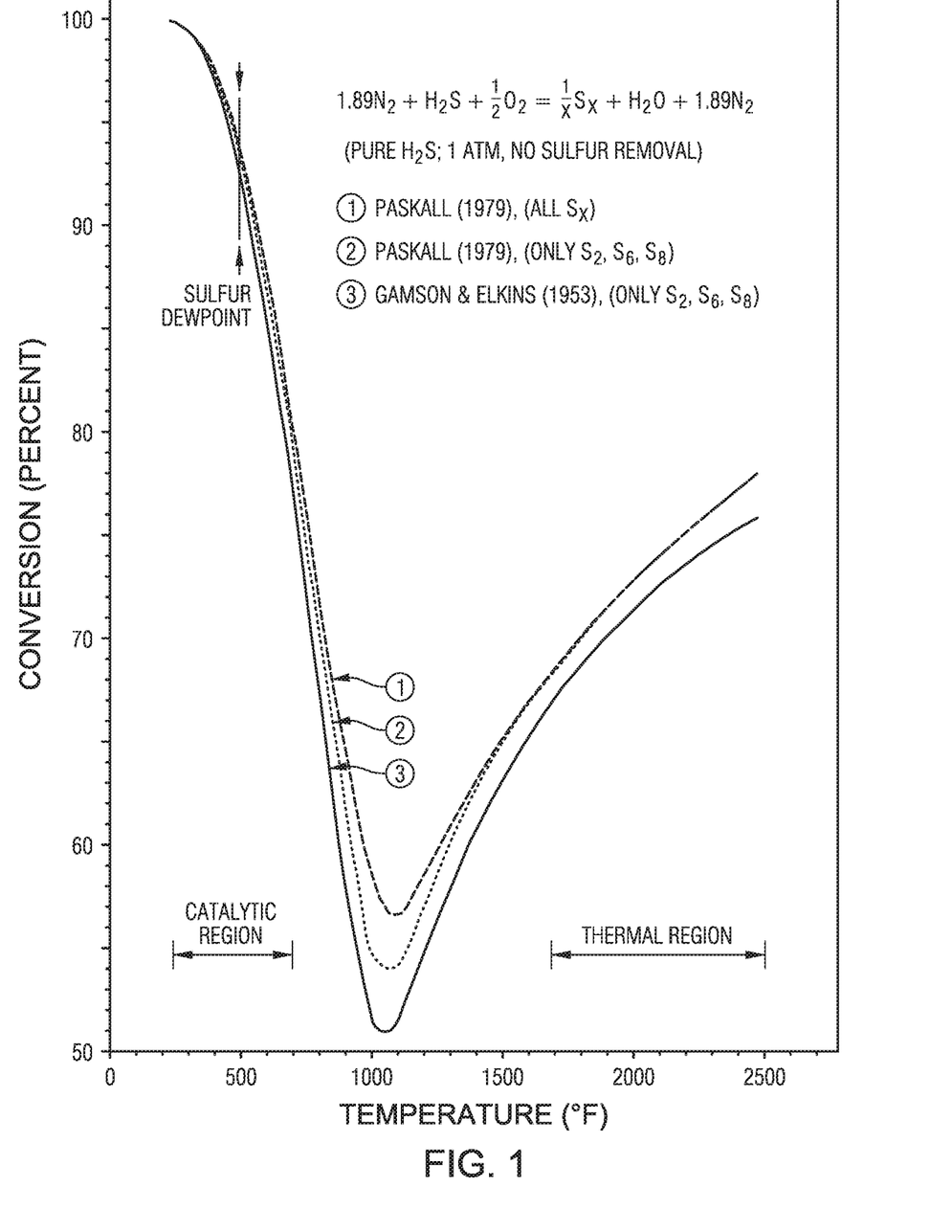
FIG. 1 is a graphical representation showing the Gamson & Elkins conversion relationship.

Advantageously, the use of the catalytic extension following the wasteheat stage takes advantage of the Gamson & Elkins conversion relationship and allows the Claus reaction to proceed further due to the removal of heat from the system, without the need for product removal. The Gamson & Elkins conversion relationship can be described with respect to FIG. 1. To understand the Gamson & Elkins conversion relationship, begin at a point on the graph at 2000 degrees Fahrenheit (deg F.), the conversion (shown along the y-axis) is approximately 70 percent. Reducing the temperature of the gas mixture to 600 deg F., the conversion is approximately 85 percent, without removing any of the Claus reaction products, such as elemental sulfur or water. Thus, the extended boiler stage of the sulfur recovery unit takes advantage of this Gamson & Elkins conversion relationship which shows that the Claus reaction equilibrium can be shifted to the right without the need to remove products, as is normally the case to shift equilibrium reactions. In a conventional Claus process, the elemental sulfur reaction product is removed in condensers in order that the equilibrium favors the production of more elemental sulfur product in the next catalytic reactor.

Advantageously, the sulfur recovery unit can recover sulfur from a lean acid gas stream without accumulation of sulfur compounds in the system, while allowing for a full recycle of sulfur dioxide recovered in the scrubbing unit.

Advantageously, the sulfur recovery unit results in reduced capital expenditures by 30 to 50% due to a reduction in the number of vessels needed. Advantageously, the sulfur recovery unit results in reduced lifecycle operating expenditures due to reduced costs attributable to catalyst regeneration and replacement. Advantageously, the sulfur recovery unit results in reduced plot plan size, resulting in saved physical space. Advantageously, the sulfur recovery unit can result in overall recovery efficiency of greater than 99.99%.

The sulfur recovery unit with an extended boiler stage has a once through conversion of sulfur compounds to elemental sulfur of 85%, which is less than the conventional Claus process which has a once through conversion of sulfur compounds to elemental sulfur of typically 96% to 98%. However, the sulfur recovery unit, as a whole, can obtain an overall conversion of sulfur compounds to elemental sulfur of greater than 99.9%.

As used here, "conventional Claus process" refers to a process that includes a reaction furnace followed by two to three conventional Claus catalytic stages.

As used here, "conventional Claus catalytic stage" refers to the catalytic stage of a conventional Claus process that includes a reheater, a catalytic converter, and a sulfur condenser.

As used here, "gross hourly space velocity" or "gas hourly space velocity" refers to a measure of the reactant gas flow rate divided by the reactor volume measured at standard temperature and pressure. In the sulfur recovery unit it is a measure of the standard volumetric flow rate of the process gas to the extended boiler stage divided by the volume of the catalyst in the extended boiler stage.

As used here, "lean acid gas" refers to an acid gas containing less than 50% by volume hydrogen sulfide.

As used here, "medium acid gas" refers to an acid gas containing 50% by volume to 75% by volume hydrogen sulfide.

As used here, "high acid gas" refers to an acid gas containing greater than 75% hydrogen.

As used here, "process gases" refers to gases that can include carbon monoxide (CO), carbon dioxide ($CO_2$), water ($H_2O$), nitrogen ($N_2$), hydrogen ($H_2$), argon (Ar), and combinations of the same.

As used here, "process contaminants" refers to contaminants that can include hydrocarbons, benzene, toluene, ethylbenzene, and xylene (BTEX), methanol ($CH_3OH$), ammonia ($NH_3$), and combinations of the same.

As used here, "sulfur-containing contaminants" refers to contaminants that can include carbonyl sulfide (COS), carbon disulfide ($CS_2$), mercaptans, and combinations of the same.

As used here, "sulfur-conversion products" refers to reaction products that can include elemental sulfur, sulfur dioxide ($SO_2$), sulfur-containing contaminants, and combinations of the same.

As used here, "sulfur compound" refers to a compound that includes sulfur.

As used here, "in the absence of" means does not contain, does not include, is not a part of, or is not a component of.

Figure 2:
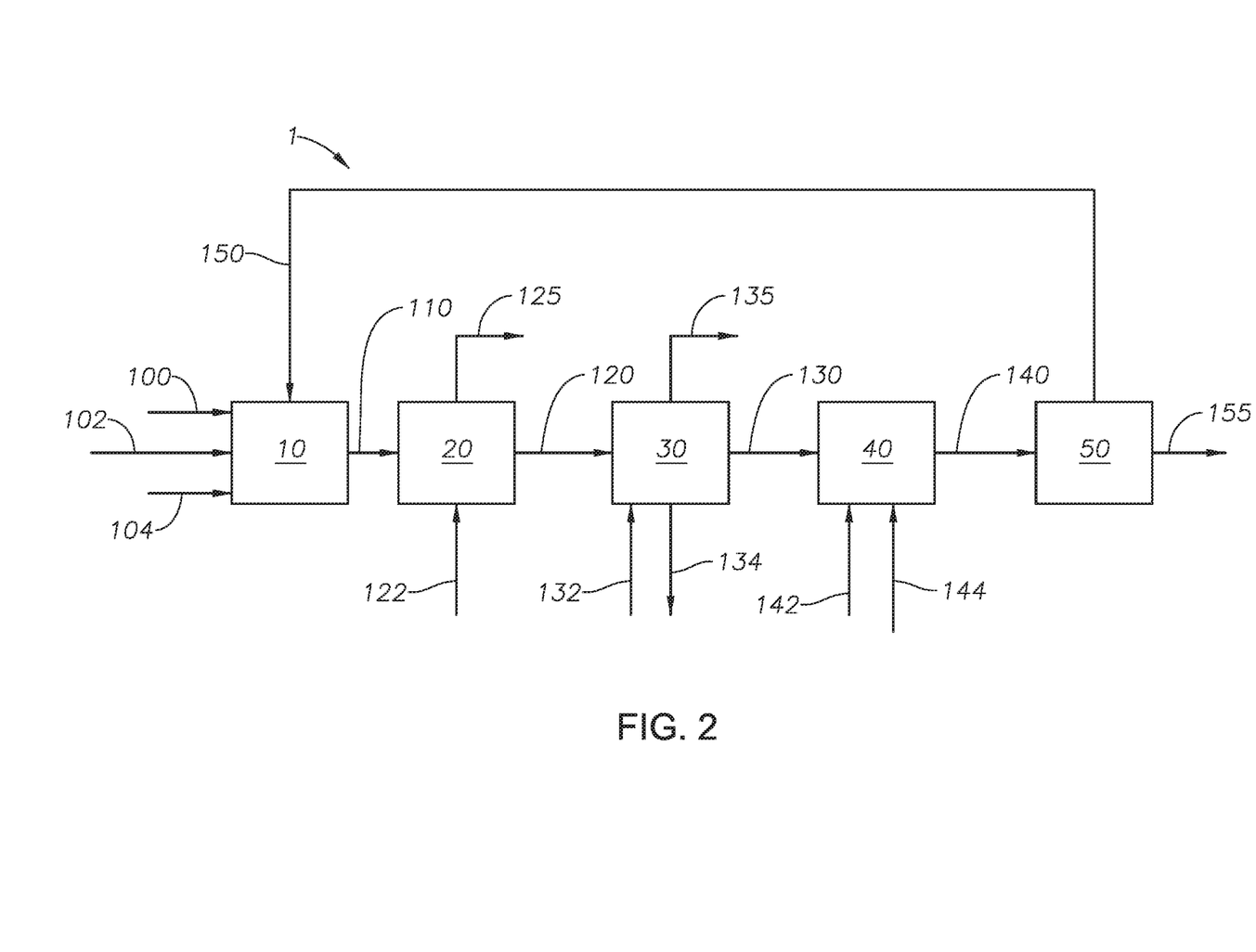
FIG. 2 is a process diagram of an embodiment.

Referring to FIG. 2, a process diagram of an embodiment of sulfur recovery unit 1 is provided.

Acid gas feed 100, fuel gas 102 and air feed 104 are introduced to reaction furnace 10. Acid gas feed 100 can be from any source of acid gas. Acid gas feed 100 can be a lean acid gas, a medium acid gas, or a high acid gas. Acid gas feed 100 can contain hydrogen sulfide, process gases, process contaminants, and sulfur-containing contaminants. The nature and composition of the process gases, process contaminants, and sulfur-containing contaminants depends on the process that is the source for acid gas feed 100. The precise composition of acid gas feed 100 depends upon the source and can be determined using any technology capable of analyzing the composition of an acid gas feed stream. In at least one embodiment, the source of acid gas feed 100 is a refinery, and acid gas feed 100 includes ammonia. In an alternate embodiment, the source of acid gas feed 100 is a sour gas plant and acid gas feed 100 is in the absence of ammonia. In at least one embodiment, there are no limits to the amount of hydrogen sulfide that can be present in acid gas feed 100.

Fuel gas 102 can be any fuel gas suitable for co-firing in reaction furnace 10. Fuel gas 102 provides additional fuel to increase and/or maintain the temperature in reaction furnace 10. In at least one embodiment, fuel gas 102 is natural gas. In at least one embodiment, fuel gas 102 includes hydrocarbons having between one and six carbon atoms ($C_1$-$C_6$).

Air feed 104 can be any oxygen ($O_2$) containing gas suitable for use in reaction furnace 10. Exemplary gases suitable for use as air feed 104 include air, oxygen enriched air, pure oxygen, or any combination of the same. In at least one embodiment, air feed 104 is air. In at least one embodiment, the volumetric flow rate of air feed 104 is provided such that oxygen is in stoichiometric excess relative to the fuel gas, such that all of the fuel gas can be burned and the temperature in the reaction furnace can be maintained. In at least one embodiment, the volumetric flow rate of air feed 104 is provided such that oxygen is in stoichiometric excess relative to the volume of fuel gas in fuel gas 102 and excess oxygen is provided such that the ratio of hydrogen sulfide to sulfur dioxide at the outlet of the reaction furnace is about 2:1. The volumetric flow rate of air feed 104 can be controlled through instrumentation such as a tail gas analyzer.

Reaction furnace 10 is any reaction furnace suitable to combust hydrogen sulfide and other components. Reaction furnace 10 can be designed and operated to convert hydrogen sulfide and the sulfur-containing contaminants to sulfur-conversion products. Reaction furnace 10 is designed and operated to destroy the process contaminants. In at least one embodiment, reaction furnace 10 can be designed and operated to maximize destruction of the sulfur-containing contaminants. In at least one embodiment, reaction furnace 10 can be designed and operated to maintain a ratio of hydrogen sulfide to sulfur dioxide at the reaction furnace outlet of 2:1. Maximizing destruction of the sulfur-containing contaminants increases the purity of sulfur recovered from sulfur recovery unit 1 and eliminates the potential for sulfur-containing contaminants to cause operating problems in units downstream of the reaction furnace. The temperature of reaction furnace 10 affects the sulfur-conversion products present in reaction effluent 110 and the amount of process contaminants that are destroyed. Reaction furnace 10 heats the components of air feed 104, fuel gas 102, and acid gas feed 100 to a minimum reaction temperature. The minimum reaction temperature ensures proper destruction of the process contaminants. The minimum reaction temperature is in the range of 850 degrees Celsius (deg C.) to 1250 deg C. In at least one embodiment, acid gas feed 100 is in the absence of ammonia and the minimum reaction temperature is at least about 1050 deg C. In at least one embodiment, acid gas feed 100 includes ammonia and the minimum reaction temperature is 1250 deg C. In at least one embodiment, reaction furnace 10 is in the absence of catalyst. In at least one embodiment, sulfur recovery unit 1 can include preheating, in a heating unit, of acid gas feed 100. In at least one embodiment, sulfur recovery unit 1 can include preheating, in a heating unit, of air feed 104. The concentration of oxygen in reaction furnace 10 affects the temperature. In at least one embodiment, sulfur recovery unit 1 can include preheating, in a heating unit, of fuel gas 102. The addition of fuel gas 102 increases the temperature in reaction furnace 10.

The components in acid gas feed 100 react with oxygen in air feed 104. Conversion of hydrogen sulfide and the sulfur-containing contaminants to elemental sulfur (as vapor) and other sulfur-conversion products occurs in reaction furnace 10. The conversion of hydrogen sulfide to elemental sulfur occurs according to the following reactions:

$$2H_2S + 3O_2 \rightarrow 2SO_2 + 2H_2O \qquad \text{reaction 1}$$

$$2H_2S + SO_2 \rightarrow 3S + 2H_2O \qquad \text{reaction 2}$$

The conversion of hydrogen sulfide and the sulfur-containing contaminants entering reaction furnace 10 to elemental sulfur is between 55 mole percent (mol %) and 85 mol %, alternately between 60 mol % and 80 mol %, alternately between 65 mol % and 75 mol %, alternately between 68 mol % and 72 mol %. The conversion of hydrogen sulfide to elemental sulfur occurs in the absence of catalyst.

Destruction reactions of process contaminants can occur in reaction furnace 10. The process contaminants present in acid gas feed 100 can be reduced by 95 percent by weight (wt %), alternately by 97 wt %, alternately by 99 wt %, alternately by 99.5 wt %, alternately by 99.9 wt %.

Reaction effluent 110 can contain hydrogen sulfide, sulfur-conversion products, process gases, process contaminants, and combinations of the same. The exact composition of reaction effluent 110 depends on the composition of acid gas feed 100 and the conditions in reaction furnace 10, including the minimum reaction temperature. The amount of hydrogen sulfide, process gases, process contaminants, and sulfur-containing contaminants present in reaction effluent 110 are reduced relative to the amount of those components present in acid gas feed 100. Reaction effluent 110 exits reaction furnace 10 at the minimum reaction temperature and is introduced to extended boiler stage 20.

Figure 3:
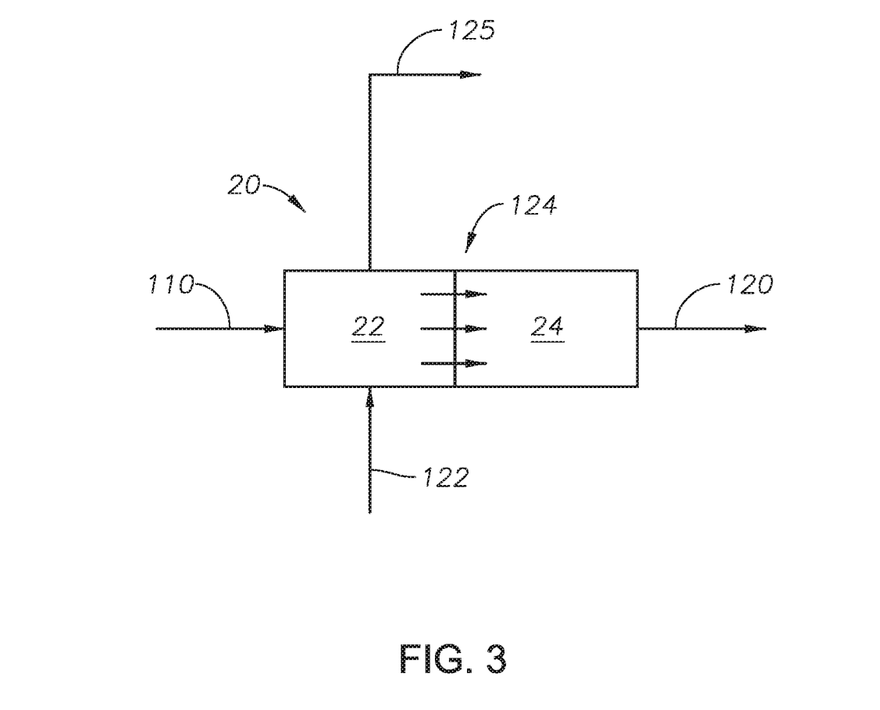
FIG. 3 is a process diagram of an embodiment.

Referring to FIG. 3, a process flow diagram of an embodiment of extended boiler stage 20 is provided. Extended boiler stage 20 includes wasteheat stage 22 and catalytic extension 24. Wasteheat stage 22 and catalytic extension 24 can be contained in one vessel. Wasteheat stage 22 can be any type of device capable of removing heat from a fluid to produce steam at desired process conditions. In at least one embodiment, wasteheat stage 22 is a single-pass shell and tube heat exchanger. Catalytic extension 24 can be physically attached to wasteheat stage 22. Catalytic extension 24 can be type of vessel or pipe capable of being bolted on to wasteheat stage 22. Catalytic extension 24 can have a diameter and a length. In at least one embodiment, catalytic extension 24 is the same diameter as wasteheat stage 22. Catalytic extension 24 can have a length between 8 feet and 20 feet and alternately between 10 feet and 15 feet. Catalytic extension 24 can be sized based on a gross hourly space velocity (GHSV) between 3000 per hour (h−1) and 6000 h−1. A GHSV between 3000 h−1 and 6000 h−1 means catalytic extension 24 is 3 to 8 times smaller than a conventional Claus catalytic stage. Advantageously, the combination of the wasteheat stage and the catalytic extension can reduce the size of the catalytic extension as compared to the catalytic converter in a conventional Claus catalytic stage, which typically has a GHSV of between 700 h−1 and 1000 h−1, while still achieving equilibrium with respect to the Claus reaction in the catalytic extension. Advantageously, the reduced size of the catalytic extension can reduce the economics and reduce the plot area necessary to support the extended boiler stage. Catalytic extension 24 can contain a catalyst section. The catalyst section can include a cage to hold the catalyst in place. The catalyst section can contain a catalyst. The catalyst can be any catalyst capable of catalyzing the Claus reaction and hydrolyzing sulfur-containing contaminants. Examples of catalyst include alumina spheres and titania extrudate. In at least one embodiment, the catalyst can include titania, which can achieve an increased rate of conversion of sulfur-containing contaminants as compared to alumina. The increased rate of conversion of sulfur-containing contaminants results in an increased overall conversion of the sulfur recovery unit, which reduces the sulfur dioxide recycled to the reaction furnace. Advantageously, the catalytic extension hydrolyzes the carbonyl sulfide and carbon disulfide produced in the reaction furnace to hydrogen sulfide, which can then participate in the Claus reactions in the catalytic stage and increase the overall conversion. The production of carbonyl sulfide and carbon disulfide in the reaction furnace negatively impacts the overall conversion of sulfur, so the hydrolysis in the catalytic extension increases the overall conversion. The addition of the catalytic extension increases the conversion of sulfur compounds resulting in reduced amounts of sulfur dioxide being recycled to the reaction furnace than a system in the absence of a conventional Claus catalytic stage. Reduced amounts of sulfur dioxide being recycled can result in a reduction in the flow rate of fuel gas to the reaction furnace.

Reaction effluent 110 is introduced to wasteheat stage 22 of extended boiler stage 20. Wasteheat stage 22 captures heat energy from reaction effluent 110 to produce cooled effluent 124. The heat energy captured from reaction effluent 110 can be used to heat boiler feed water 122 to generate high pressure steam 125. Boiler feed water 122 can be any source of water suitable for use to produce steam. High pressure steam 125 can be saturated steam at a pressure greater than 50 pounds per square inch gauge (psig) and alternately between 50 psig and 600 psig. Cooled effluent 124 is at a boiler section outlet temperature, where wasteheat stage 22 reduces the temperature of reaction effluent 110 from the minimum reaction temperature to the boiler section outlet temperature. The amount of heat energy captured from reaction effluent 110 can control the boiler section outlet temperature. The boiler section outlet temperature can be between 148 deg C. and 254 deg C.

Cooled effluent 124 flows from wasteheat stage 22 to catalytic extension 24. Cooled effluent 124 can contain sulfur-conversion products, hydrogen sulfide, process gases, process contaminants, and sulfur-containing contaminants. Hydrogen sulfide, sulfur dioxide, and sulfur-containing contaminants can be converted to elemental sulfur in catalytic extension 24.

Catalytic extension 24 can increase the overall conversion of sulfur in sulfur recovery unit 1 from 40 percent (%) to 75% in reaction furnace 10 to 75% to 85% after extended boiler stage 20 in boiler catalytic effluent 120. Advantageously, extended boiler stage 20 reduces the amount of sulfur compounds that will be recycled to the reaction furnace and avoids a sulfur dioxide accumulation effect that can occur when the overall conversion in sulfur recovery unit 1 is less than 66.6%. For a lean acid gas, the conversion in reaction furnace 10 can be less than 66%, typically between 40% and 65%; the addition of extended boiler stage 20 increases the conversion to greater than 66.6%.

The reactions in catalytic extension 24 can be exothermic, such that both the Claus reactions and the hydrolysis of carbonyl sulfide and carbon disulfide are exothermic, resulting in an increase in temperature in catalytic extension 24. Boiler catalytic effluent 120 is at a boiler catalytic effluent temperature. The boiler catalytic effluent temperature can be between 250 deg C. and 400 deg C. Boiler catalytic effluent 120 can contain hydrogen sulfide, sulfur-conversion products, process gases, process contaminants, and combinations of the same. The exact composition of boiler catalytic effluent 120 depends on the composition of acid gas feed 100, the conditions in reaction furnace 10, including the minimum reaction temperature, and the catalyst in catalytic extension 24. The amount of hydrogen sulfide, process gases, process contaminants, and sulfur-containing contaminants present in boiler catalytic effluent 120 are reduced relative to the amount of those components present in reaction effluent 110.

Returning to FIG. 2, boiler catalytic effluent 120 exits extended boiler stage 20 and can be introduced to condenser 30.

Condenser 30 can reduce further the temperature of boiler catalytic effluent 120 causing the elemental sulfur to condense as liquid sulfur 134. The temperature of liquid sulfur 134 is between 120 deg C. and 155 deg C. and alternately between about 125 deg C. and about 150 deg C. Liquid sulfur 134 contains greater than 95 wt % elemental sulfur, alternately greater than 97 wt % elemental sulfur, alternately greater than 99 wt % elemental sulfur, alternately greater than 99.5 wt % elemental sulfur, and alternately greater than 99.9 wt % elemental sulfur. The heat energy captured from boiler catalytic effluent 120 can be used to heat condenser feed water 132 to produce low pressure steam 135. Condenser feed water 132 can be any source of water suitable for use to produce steam. In at least one embodiment, low pressure steam 135 is a low pressure saturated steam at a pressure of 50 psig.

The other components present in boiler catalytic effluent 120, that do not condense as part of liquid sulfur 134, exit condenser 30 in gases stream 130. Gases stream 130 can include sulfur-conversion products, hydrogen sulfide, process gases, process contaminants, and sulfur-containing contaminants. The exact composition of gases stream 130 depends on the composition of boiler catalytic effluent 120. In at least one embodiment, gases stream 130 contains less than about 1% by volume elemental sulfur in the vapor phase.

Gases stream 130 can be introduced to thermal oxidizer 40. Fuel gas stream 142 and air stream 144 can be introduced to thermal oxidizer 40. Air stream 144 can be the same source or a different source as air feed 104. Air stream 144 provides oxygen to thermal oxidizer 40 in stoichiometric excess to the sulfur-containing contaminants present in gases stream 130. In at least one embodiment, the volumetric flow rate of air stream 144 results in an excess oxygen content of 2% by volume in thermal oxidizer 40. Fuel gas stream 142 can be the same source of fuel gas as fuel gas 102 or a different source of fuel gas. Thermal oxidizer 40 can combust the hydrogen sulfide and sulfur-containing contaminants in the presence of excess oxygen to create sulfur dioxide along with other combustion products to create oxidizer outlet stream 140. Oxidizer outlet stream 140 can contain sulfur dioxide, process gases, trace amounts of sulfur-containing contaminants, and combinations of the same. Oxidizer outlet stream 140 has a reduced amount of sulfur-containing contaminants relative to gases stream 130. In at least one embodiment, elemental sulfur present in gases stream 130 is converted to sulfur dioxide in thermal oxidizer 40. Thermal oxidizer 40 can operate at a temperature between 530 deg C. and 750 deg C., alternately between 538 deg C. and 750 deg C., alternately between 550 deg C. and 750 deg C., alternately between 575 deg C. and 725 deg C., and alternately between 600 deg C. and 700 deg C. In at least one embodiment, thermal oxidizer 40 is in the absence of catalyst.

Oxidizer outlet stream 140 can be introduced to scrubbing unit 50. Scrubbing unit 50 can be any type of scrubbing unit using a regenerable scrubbing medium capable of separating or removing an amount of sulfur dioxide from a process stream. Scrubbing unit 50 separates sulfur dioxide from oxidizer outlet stream 140 to produce recycle stream 150 and effluent gases stream 155. In scrubbing unit 50, the regenerable scrubbing medium can capture the sulfur dioxide in a first step and then release the sulfur dioxide in a second step. This allows scrubbing unit 50 to operate in a loop.

Recycle stream 150 contains the amount of sulfur dioxide separated from oxidizer outlet stream 140. In at least one embodiment, recycle stream 150 contains sulfur dioxide saturated with water. In at least one embodiment, the amount of sulfur dioxide in recycle stream 150 is greater than about 90.0% by volume, alternately between 90.0% by volume and 97.0% by volume, and alternately less than or equal to 98.0% by volume. Recycle stream 150 is recycled to reaction furnace 10. In at least one embodiment, the volumetric flowrate of air feed 104 can be adjusted based on the volumetric flow rate of recycle stream 150.

The gases remaining exit scrubbing unit 50 in effluent gases stream 155. Effluent gases stream 155 can contain process gases, sulfur dioxide, trace levels of contaminants, and combinations of the same. Effluent gases stream 155 can contain sulfur dioxide in an amount less than 2% by volume, alternately less than 1% by volume, alternately less than 0.1% by volume, alternately less than 0.01% by volume, alternately less than 0.001% by volume, alternately less than 0.0001% by volume, alternately less than 0.00005% by volume, alternately less than 0.00001% by volume. Effluent gases stream 155 can be sent for further processing, vented to atmosphere, or used in another processing unit. In at least one embodiment, effluent gases stream 155 is vented to atmosphere.

Various process control elements can be included in the sulfur recovery unit to provide for better control of the process units and the overall conversion of hydrogen sulfide and sulfur-containing contaminants to elemental sulfur.

Figure 4:
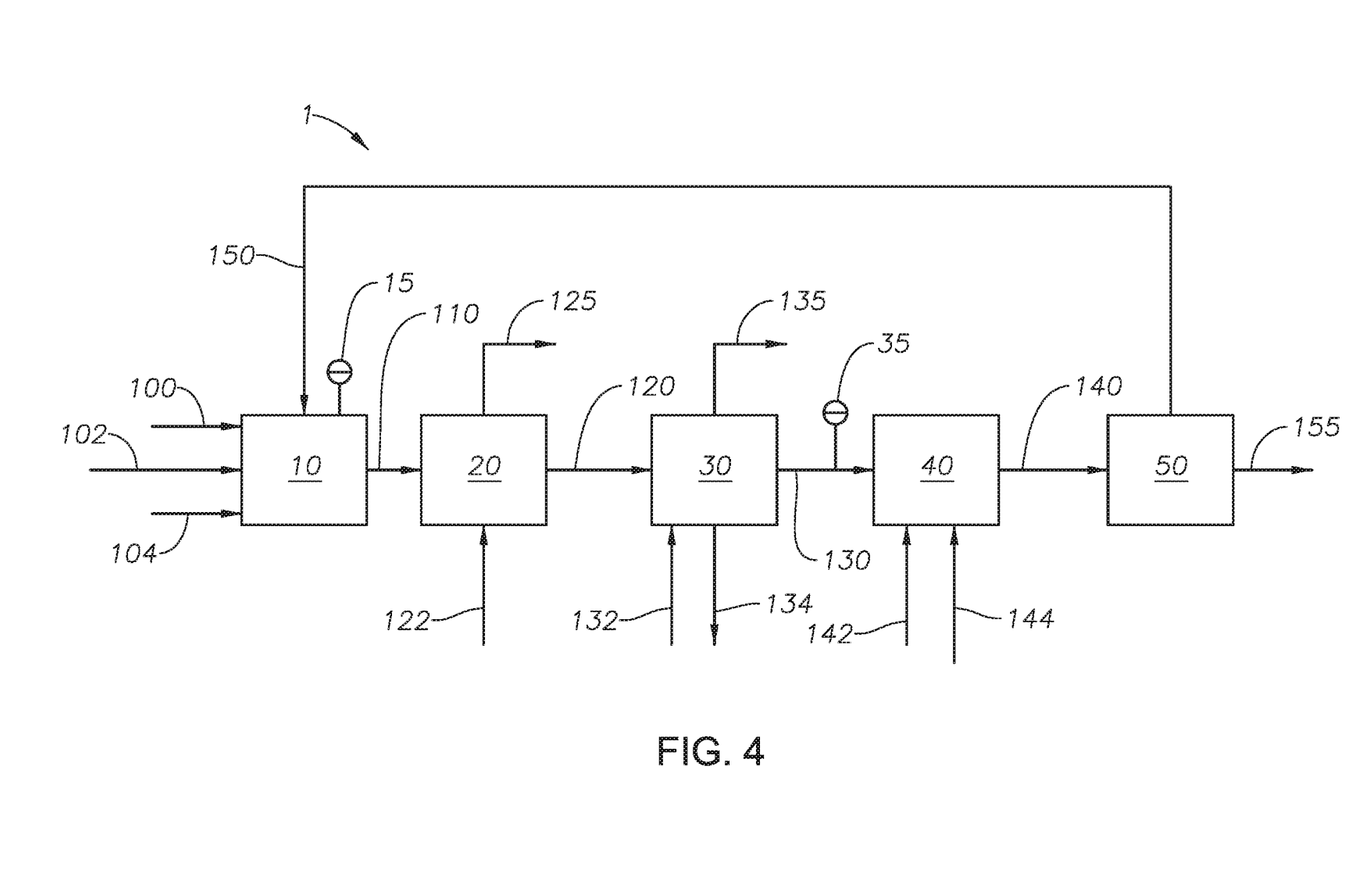
FIG. 4 is a process diagram of an embodiment.

With reference to FIG. 4, tail gas analyzer 35 can be installed after condenser 30 to analyze the composition in gases stream 130. Tail gas analyzer 35 can be any type of analytical instrumentation capable of measuring one or more components in a gas stream. In at least one embodiment, tail gas analyzer 35 analyzes the amount of hydrogen sulfide and the amount of sulfur dioxide in gases stream 130. In at least one embodiment, the composition of gases stream 130 as determined by tail gas analyzer 35 can be used to adjust the flow rate of air feed 104 as part of a feedback control loop to maintain a stoichiometric ratio of hydrogen sulfide to sulfur dioxide of 2:1. Temperature sensor 15 can be included in reaction furnace 10. Temperature sensor 15 can be any type of instrument capable of measuring a temperature in the reaction furnace. In at least one embodiment, temperature sensor 15 can be used to adjust the flow rate of fuel gas 102 as needed to maintain or reach the minimum reaction temperature. Advantageously, the ability to control sulfur recovery unit 1 with instrumentation contributes to the simplicity of sulfur recovery unit 1.

The overall conversion of hydrogen sulfide and sulfur-containing contaminants to elemental sulfur in sulfur recovery unit can be greater than about 99 mole percent (mol %), alternately greater than about 99.2 mol %, alternately greater than about 99.4 mol %, alternately greater than about 99.6 mol %, alternately greater than about 99.8 mol %, alternately greater than about 99.9 mol %, and alternately greater than 99.99 mol %.

Figure 5:
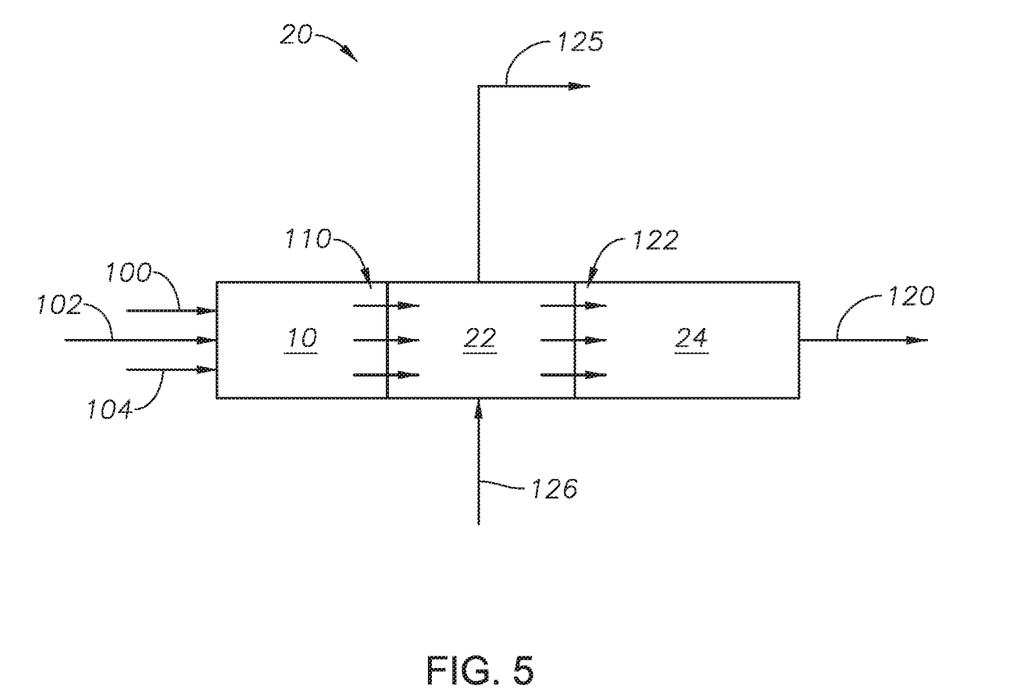
FIG. 5 is a process diagram of an embodiment.

Referring to FIG. 5 and with reference to FIG. 3, an alternate embodiment of reaction furnace 10 and extended boiler stage 20 is provided. Reaction furnace 10 can be physically connected to extended boiler stage 20 such that reaction effluent 110 passes from reaction furnace 10 to wasteheat stage 22 without entering external piping.

The sulfur recovery unit can be in the absence of a conventional Claus catalytic stage. The sulfur recovery unit does not include a bauxite catalyst, such that the catalyst section is in the absence of bauxite. The scrubbing unit can be in the absence of a caustic scrubbing medium because caustic scrubber is non-regenerable and even small amounts of elemental sulfur vapor could solidify in a caustic scrubber. The scrubbing unit can be in the absence of oxygen as a scrubbing medium.

Although the embodiments have been described with respect to certain features, it should be understood that the features and embodiments of the features can be combined with other features and embodiments of the features.

Although the embodiments have been described in detail, it should be understood that various changes, substitutions, and alterations can be made hereupon without departing from the principle and scope. Accordingly, the scope of the embodiments should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art, except when these references contradict the statements made here.

As used here and in the appended claims, the words "comprise," "has," and "include" and all grammatical variations thereof are each intended to have an open, non-limiting meaning that does not exclude additional elements or steps.

As used here, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the embodiments.

What is claimed is:

1. An apparatus for recovering sulfur from an acid gas stream, the apparatus comprising:
    a reaction furnace, the reaction furnace configured to contain a reaction between hydrogen sulfide in the acid gas stream and oxygen in an air feed to produce a reaction effluent, where the reaction furnace operates at a minimum reaction temperature, where the reaction effluent comprises elemental sulfur;
    an extended boiler stage, where the extended boiler stage comprises:
        a wasteheat stage, the wasteheat stage fluidly connected to the reaction furnace, the wasteheat stage configured to capture heat energy from a reaction effluent to produce a cooled effluent, where the cooled effluent is at a boiler section outlet temperature, and
        a catalytic extension physically connected to the wasteheat stage, the catalytic extension configured to allow a reaction to convert sulfur compounds to produce a boiler catalytic effluent, where the boiler catalytic effluent comprises elemental sulfur, where the catalytic extension comprises a catalyst section, where the catalyst section comprises a catalyst, where the boiler catalytic effluent is at a boiler catalytic effluent temperature;
    a condenser fluidly connected to the catalytic extension, the condenser configured to condense the elemental sulfur to produce liquid sulfur and a gases stream;
    a thermal oxidizer fluidly connected to the condenser, the thermal oxidizer configured to oxidize sulfur compounds in the gases stream and oxygen in an air stream to produce an oxidizer outlet stream, the oxidizer outlet stream comprising sulfur dioxide; and
    a scrubbing unit fluidly connected to the thermal oxidizer, the scrubbing unit configured to separate the sulfur dioxide from the gases stream to produce a recycle stream and an effluent gases stream, where the recycle stream comprises the sulfur dioxide.

2. The apparatus of claim 1, where the minimum reaction temperature is between 850 deg C. and 1250 deg C.

3. The apparatus of claim 1, where the wasteheat stage comprises a heat exchanger.

4. The apparatus of claim 1, where the boiler section outlet temperature is between 148 deg C. and 254 deg C.

5. The apparatus of claim 1, where the boiler catalytic effluent temperature is between 250 deg C. and 400 deg C.

6. The apparatus of claim 1, where the catalytic extension has a gross hourly space velocity between 3000 h−1 and 6000 h−1.

7. The apparatus of claim 1, where the catalyst is titania extrudate.

8. The apparatus of claim 1, where the catalyst comprises alumina.

9. The apparatus of claim 1, where an overall conversion of sulfur compounds to elemental sulfur is greater than 99.9 mol %.

10. The apparatus of claim 1, further comprising a tail gas analyzer fluidly connected to the condenser, the tail gas analyzer configured to analyze a composition of the gases stream.

11. The apparatus of claim 1, further comprising a temperature sensor fluidly connected to the reaction furnace, the temperature sensor configured to measure the minimum reaction temperature in the reaction furnace.

* * * * *